United States Patent
Yamada

[19]

[11] Patent Number: 6,072,422
[45] Date of Patent: Jun. 6, 2000

[54] FM-CW RADAR APPARATUS

[75] Inventor: Yukinori Yamada, Susono, Japan

[73] Assignee: Toyota Jidosha Kabushiki Kaisha, Aichi-ken, Japan

[21] Appl. No.: 09/327,560

[22] Filed: Jun. 8, 1999

[30] Foreign Application Priority Data

Aug. 18, 1998 [JP] Japan .................................. 10-231571

[51] Int. Cl.[7] .................................................. G01S 13/42
[52] U.S. Cl. ............................. 342/70; 342/111; 342/113; 342/115; 342/116; 342/133; 342/146; 342/196
[58] Field of Search .................................. 342/70, 71, 72, 342/109, 111, 112, 113, 115, 116, 133, 135, 146, 158, 192, 194, 196

[56] References Cited

U.S. PATENT DOCUMENTS

| | | | |
|---|---|---|---|
| 5,732,344 | 3/1998 | Yamada | 342/72 |
| 5,751,240 | 5/1998 | Fujita et al. | 342/70 |
| 5,982,321 | 11/1999 | Iihoshi et al. | 342/158 |

FOREIGN PATENT DOCUMENTS

| | | | |
|---|---|---|---|
| 4-04313090A | 11/1992 | Japan | G01S 13/34 |
| 7-49377 | 2/1995 | Japan . | |
| 9-145833 | 6/1997 | Japan . | |
| 409222474A | 8/1997 | Japan | G01S 13/34 |
| 9-304519 | 11/1997 | Japan . | |
| 10-020025A | 1/1998 | Japan | G01S 13/38 |

*Primary Examiner*—John B. Sotomayor
*Attorney, Agent, or Firm*—Finnegan, Henderson, Farabow, Garrett & Dunner, L.L.P.

[57] ABSTRACT

An FM-CW radar apparatus permits proper pairing between beat frequencies in an up interval and beat frequencies in a down interval and comprises a peak extracting section for extracting level peaks at each scanning angle of beat frequencies, each beat frequency being a frequency difference between a received wave and a transmitted wave, in each of a modulation frequency increasing interval and a modulation frequency decreasing interval; a grouping section for grouping level peaks of approximately equal beat frequencies adjacent in a scanning direction to create level peak groups having respective typical scanning angles, for either of the increasing-interval level peaks and decreasing-interval level peaks thus extracted; a pairing section for pairing a level peak group in the increasing interval with a level peak group in the decreasing interval where the level peak groups have an equal typical scanning angle; and a calculating section for calculating target information from beat frequencies of the increasing-interval and decreasing-interval level peak groups thus paired.

5 Claims, 5 Drawing Sheets

FM-CW RADAR APPARATUS

BACKGROUND OF THE INVENTION

1. Field of the Invention

The present invention relates to an FM-CW radar apparatus using a transmitted signal resulting from frequency modulation (FM) of continuous wave (CW).

2. Related Background Art

The FM-CW radar apparatus is suitable for detection of an object in a relatively near range, as compared with pulse radar apparatus. In recent years, research and development is being carried out in the field of the FM-CW radar apparatus as means for detecting the position and relative speed of a preceding car or the like while being mounted on a car.

In the FM-CW radar apparatus, the distance and velocity of a target existing in a beam direction are calculated from a beat frequency in a modulation frequency increasing interval (hereinafter referred to simply as an up interval) and a beat frequency in a modulation frequency decreasing interval (hereinafter referred to simply as a down interval) in the same beam. Here, the beat frequency means a frequency difference between a transmitted wave and a reflected wave from the target or the like exposed to the transmitted wave. This operation is carried out for all beams in the scanning range to obtain information of targets existing in the scanning range.

When there is only one target, a single level peak (maximum) based on the reflected wave from the target is obtained at a beat frequency in each of the up interval and the down interval. Therefore, the distance and speed of the target can be calculated using the beat frequencies of the level peaks in the respective intervals.

If various objects are mixed in the detecting range there will exist a plurality of targets in one beam, however. In this case, there exist a plurality of level peaks of beat frequencies in each of the up interval and down interval. It was thus not easy to determine which beat frequency level peak in the down interval should be paired with an arbitrary level peak of beat frequency in the up interval, and it was also easy to make pairing errors.

Particularly, when the FM-CW radar apparatus is used as an on-vehicle radar apparatus for detecting a vehicle around it, reflection originates not only from the vehicle as a primary target, but also from various objects such as fixed objects on the road side except for the primary target. It was thus easy to make the pairing errors as described above.

For example, supposing reflection takes place from two objects, a moving object and a fixed object, the relation of magnitude of the beat frequencies corresponding to the respective objects can be reverse between in the up interval and in the down interval; in that case, if pairing is done simply in the order of magnitude of the beat frequencies, the apparatus will fail to perform correct recognition of the targets.

SUMMARY OF THE INVENTION

The FM-CW radar apparatus of the present invention has been accomplished in order to solve the above problem and comprises peak extracting means for extracting level peaks at each scanning angle of beat frequencies, each beat frequency being a frequency difference between a received wave and a transmitted wave, in each of a modulation frequency increasing interval and a modulation frequency decreasing interval; grouping means for grouping level peaks of approximately equal beat frequencies adjacent in a scanning direction to create level peak groups having respective typical scanning angles, for either of the increasing-interval level peaks and decreasing-interval level peaks thus extracted; pairing means for pairing a level peak group in the increasing interval with a level peak group in the decreasing interval where said level peak groups have an equal typical scanning angle; and calculating means for calculating target information from beat frequencies of the increasing-interval and decreasing-interval level peak groups thus paired.

When beam scanning is carried out in a predetermined range within a short period of time in which the distance and speed of the target are substantially unchanged, the beat frequency based on a reflected wave from an arbitrary target is defined as one value in each of the up interval and down interval.

Therefore, focusing attention on the beat frequencies of level peaks extracted by the peak extracting means, it can be assumed that level peaks of an equal beat frequency continuous in the scanning direction in each of the up interval and down interval are based on a radio wave reflected by a single target.

The grouping means groups such level peaks of an equal beat frequency to create a level peak group considered to be corresponding to one target. Each level peak value in one level peak group is highest when the beam bearing (scanning angle) is at the center of the target, but it becomes gradually smaller as the beam becomes more distant from the center of the target.

On the other hand, agreement must be achieved between typical scanning angles of the level peak group in the up interval and the level peak group in the down interval corresponding to one target, i.e., between scanning angles of level peaks to exhibit the highest levels in the level peak groups.

When the pairing means is arranged to compare the level peak groups in the up interval with the level peak groups in the down interval and pair level peak groups having an equal typical scanning angle while selecting them respectively from the up interval and the down interval, level peak groups corresponding to different targets can be prevented from being paired with each other.

Since the typical scanning angle is normally a center of a scanning angle range of a level peak group, it is also a center scanning angle.

The distance and speed of a target can be detected without an error by applying the beat frequencies of the level peak groups paired as described above to the general equations for the target detection of FM-CW radars in the calculating means.

However, if beat frequencies originating from plural targets agree with each other, as in the case where a plurality of targets run abreast at an equal distance and at an equal speed, there is the possibility that the grouping means creates a single level peak group, though there are the plural targets. In this case, normally, either one of the plural targets is detected as a representative, though depending upon how to determine the typical scanning angle.

In cases where one level peak group is created for plural targets as described above, a peak distribution width of the level peak group is wide in general. Generally speaking, there is the upper limit to the distribution width of the level peak group corresponding to one target, in other words, to the scanning angle range subtending the level peak group, though depending upon the utilization purpose of the radar apparatus.

It is thus desirable that when the peak distribution width of the level peak group is not less than a predetermined width, a level peak group of a new peak distribution should be created by subtracting a standard distribution from the peak distribution.

The new level peak group created in this way is one based on the targets excluding the target with the strongest intensity of reflected wave out of the plural targets, and the resolution of detection of target can be further enhanced by the pairing of level peak groups including this new level peak group.

The standard distribution is desirably one obtained by normalization of level peak data of a single target which is preliminarily measured and stored.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
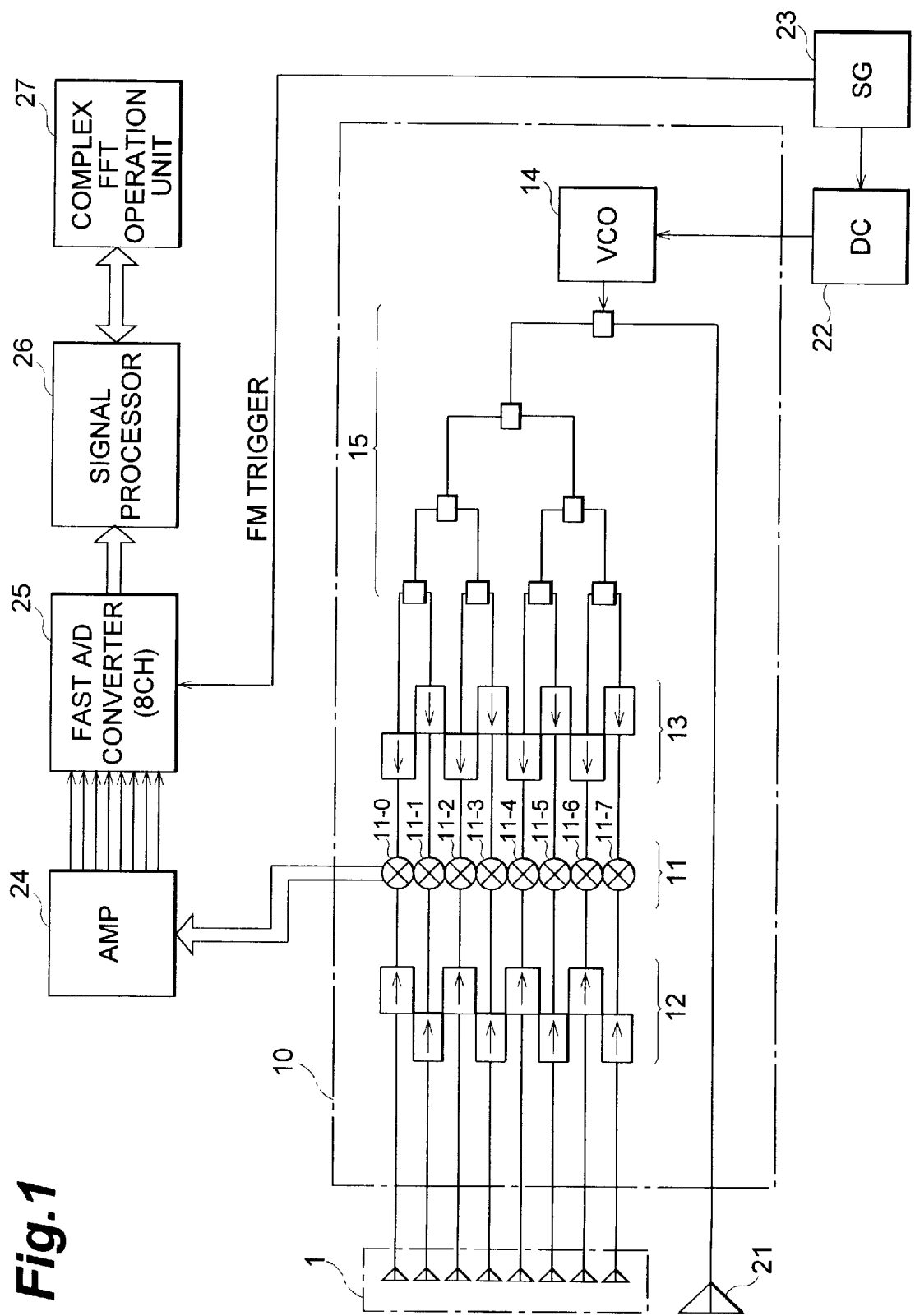
FIG. 1 is a block diagram to show the structure of an FM-CW radar apparatus as an embodiment of the present invention.

FIG. 1 is a block diagram to show the structure of an FM-CW radar apparatus as an embodiment of the present invention. This FM-CW radar apparatus is also a DBF radar apparatus arranged to create antenna beams by digital signal processing to scan.

An array antenna 1 for reception has eight antenna elements corresponding to respective receiving channels. The antenna elements are connected via individual isolators composing an isolator group 12 to respectively corresponding mixers 11-0 to 11-7.

The mixers 11-0 to 11-7 are arranged each to mix a received signal arriving at each antenna element (a received wave) with part of a transmitted signal (a transmitted wave) to obtain a beat signal. Transmitted signal components supplied as local signals to the mixers 11-0 to 11-7 are supplied thereto from a voltage-controlled oscillator (VCO) 14 via a branch circuit 15 and an isolator group 13.

The oscillator 14 is a varactor control type Gunn oscillator having the center frequency of f0 (for example, 60 GHz), which outputs a modulated wave in the range of f0±(½)ΔF, based on control voltage outputted from a dc power supply 22 for modulation. The FM modulation herein is triangular modulation in which frequency increasing intervals (up intervals) and frequency decreasing intervals (down intervals) are alternately continuous. In the triangular modulation, frequencies linearly increase from f0−(½)ΔF to f0+(½)ΔF in the up intervals, while frequencies linearly decrease from f0+(½)ΔF to f0−(½)ΔF in the down intervals within the same period of time as in the up intervals.

This FM modulated wave is supplied via the branch circuit 15 to a transmitter antenna 21 to be radiated as a transmitted signal and is also branched into eight channels as local signals, as described above, to be mixed respectively with the received signals in the eight channels in the respective mixers 11-0 to 11-7 to generate beat signals of the respective channels. The dc power supply 22 changes its output voltage values in a triangular pattern on a periodic basis under control of a signal source 23 for modulation.

At the post end of the high-frequency circuit 10 composed of the mixer group 11, the isolator groups 12, 13, the oscillator 14, and the branch circuit 15, there are provided a low-noise amplifier 24, a fast A/D converter 25, a signal processing unit 26, and a complex FFT operation unit 27.

The low-noise amplifier (amp) 24 amplifies the beat signals of the eight channels outputted from the mixers 11-0 to 11-7 in parallel. The amp 24 incorporates a low-pass filter having the cut-off frequency of 77 kHz for antialiasing.

The fast A/D converter 25 is a circuit for effecting A/D conversion of the beat signals of the eight channels in parallel and simultaneously, which samples the signals at 200 kHz. At this sampling frequency the converter 25 performs sampling at 128 points in each of the up interval and down interval of the triangular wave in the FM modulation.

Figure 2:
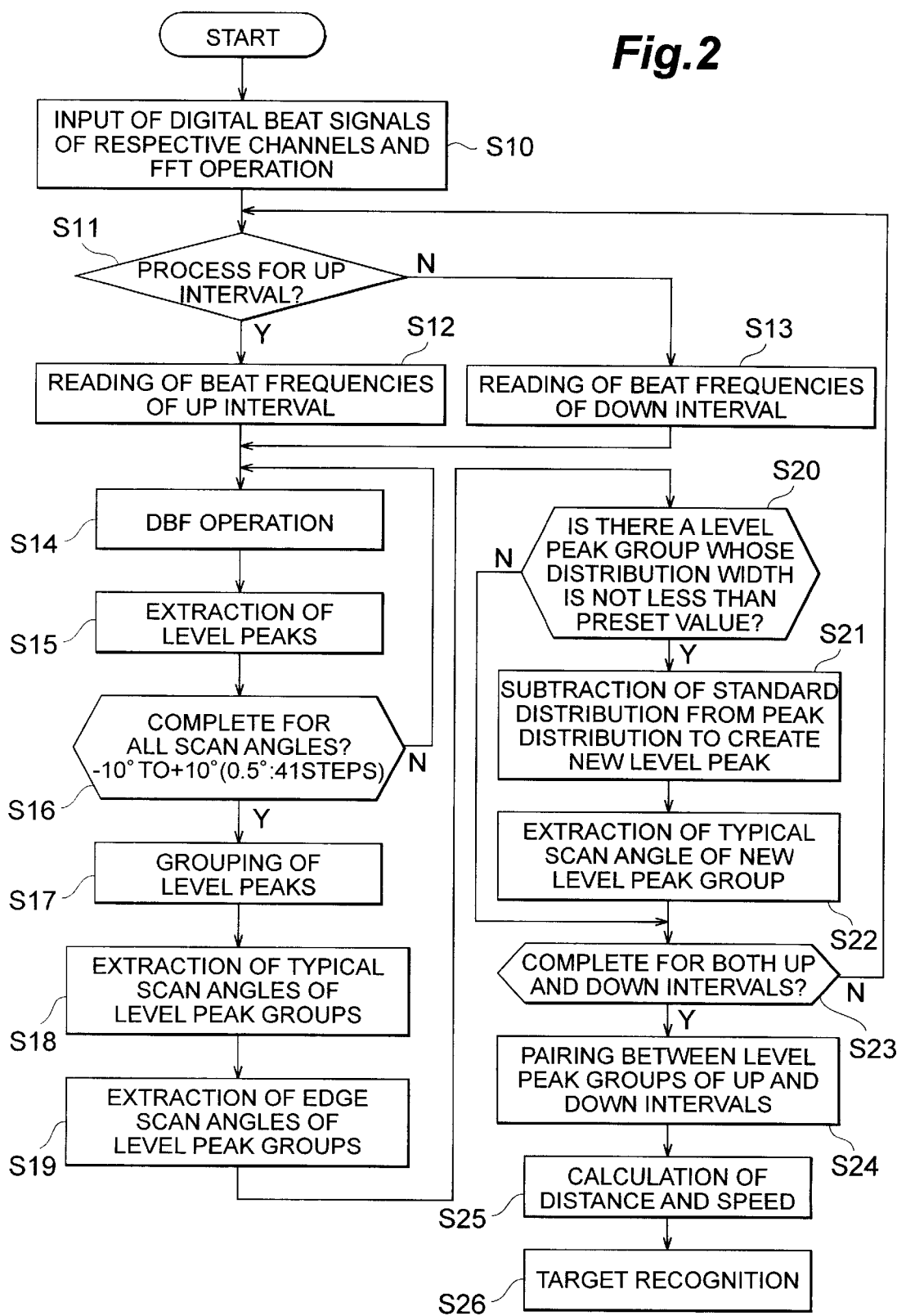
FIG. 2 is a flowchart to show the operation of the apparatus.

The signal processing unit 26 acquires digital beat signals of the respective channels from the fast A/D converter 25 and performs various signal processing operations according to the flowchart illustrated in FIG. 2 to carry out a recognition operation of a target (object).

The complex FFT operation unit 27 is an operation unit for carrying out the complex FFT operation among the series of operations in the signal processing unit 26 in place thereof. The complex FFT operation unit 27 receives the digital beat signals of the respective channels from the signal processing unit 26, performs the complex FFT operation therewith, and sends the result back to the signal processing unit 26.

Next, the procedures of the operation of the present apparatus will be described according to the flowchart illustrated in FIG. 2.

First, step S10 is to capture the digital beat signals of the respective channels. Since the digital beat signals of the respective channels are obtained by the sampling at 128 points in each of the up interval and down interval in every channel, they are data totally at 128 (points)×2 (intervals)×8 (channels)=2048 points. Then the FFT (fast Fourier transform operation) is carried out channel by channel, based on these data, thereby obtaining beat frequency information. The beat frequency information obtained here is stored all in a memory section in the signal processing unit 26. This beat frequency information of the respective channels include phase information necessary for the later DBF operation.

Step S11 is to determine whether the various operations hereinafter are to be carried out for the data in the up interval. When this determination is affirmative, that is, when the operations hereinafter are for the data in the up interval, the processing unit moves to step S12 to read the digital beat frequency information of the up interval stored in step S10 to be ready for the successive DBF operation. When the determination is negative in step S11, the processing unit proceeds to step S13 to read the digital beat frequency information of the down interval stored in step S10 to be ready for the successive DBF operation.

Step S14 is to effect phase rotation of the beat frequency information in each channel by digital signal processing to form a beam in a direction of one scanning angle out of forty one directions obtained by dividing the range of −10° to +10° at intervals of 0.5°. Step S15 is to extract a level peak with the beat frequency as a variable in the bearing (the scanning angle θ) of the beam formed in step S14. Step S16 is to determine whether the DBF operation in step S14 and the level peak extraction operation in step S15 are finished for all the directions, i.e., for the forty one directions ranging from −10° to +10°. When the level peak extraction is complete for all the directions, the processing unit goes to step S17.

Step S17 is to group level peaks of approximately equal beat frequencies adjacent in the scanning direction to create level peak groups.

Figure 3A:
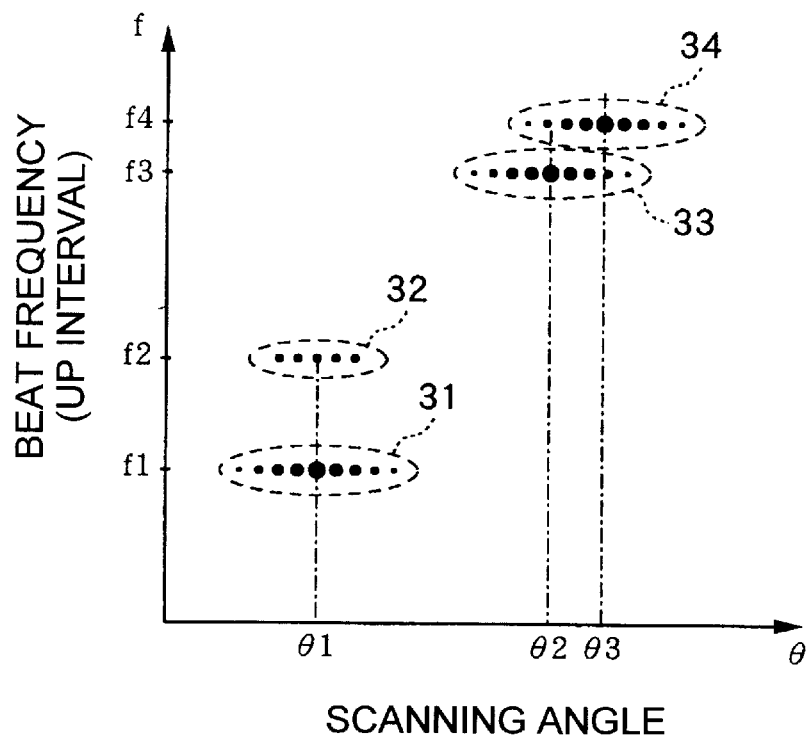
FIG. 3A is a graph for explaining pairing of level peak groups.
Figure 3B:
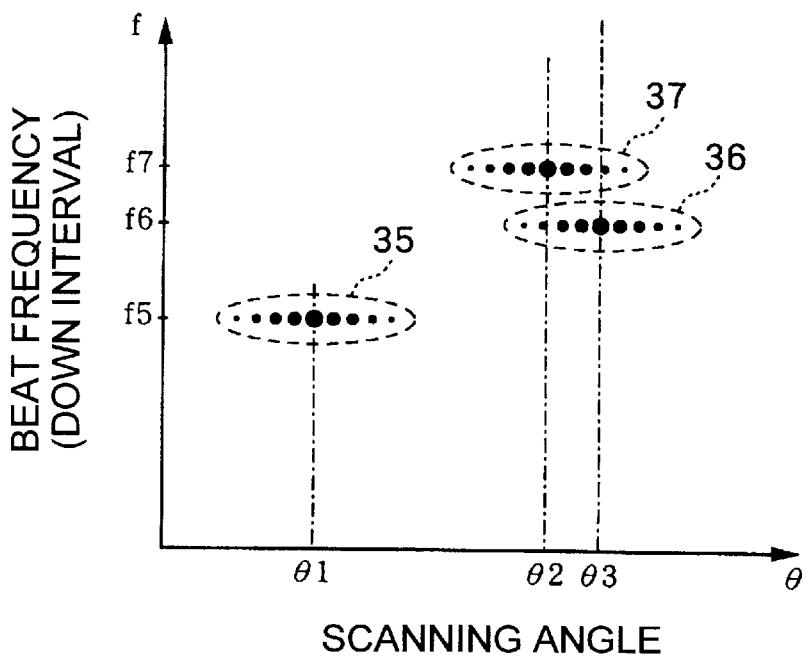
FIG. 3B is a graph for explaining pairing of level peak groups.

FIG. 3A and FIG. 3B are graphs to show the details of the grouping operation, wherein FIG. 3A shows the grouping in the up interval and FIG. 3B the grouping in the down interval. In FIG. 3A and FIG. 3B, the scanning angles are plotted along the abscissa while the beat frequencies along the ordinate. Each level peak is indicated by a dot and the size of each dot indicates a height of a level peak. The higher the level peak, the larger the size of dot.

Let us suppose that the processing of the up interval is under way at present. Referring to FIG. 3A, it is seen that there exist a plurality of level peaks at the beat frequency f1 continuously in a scanning angle range around the scanning angle θ1. In step S17 these level peaks are grouped into one level peak group 31. Likewise, there are plural level peaks at each beat frequency f2, f3, or f4 in the scanning angle range around the scanning angle θ1, θ2, or θ3, respectively, and thus they are grouped into a level peak group 32, 33, or 34, respectively.

After completion of the grouping of level peaks, step S18 is carried out to extract a typical scanning angle of each group. In this embodiment the typical scanning angle is defined as a scanning angle of a level peak indicating the highest level in each level peak group. Referring to FIG. 3A, the typical scanning angle of the level peak groups 31 and 32 is θ1, and the typical scanning angles of the level peak groups 33 and 34 are θ2 and θ3, respectively.

Next, step S19 is to extract edge scanning angles of each level peak group. The edge scanning angles are scanning angles of levels a predetermined value lower than the maximum level (the level at the typical scanning angle) of each level peak group. In the case of the example of FIG. 3A, the edge scanning angles are scanning angles of level peaks located at the left edge and at the right edge of each level peak group 31 to 34.

Step S20 is to check a level peak distribution width of each level peak group, i.e., an angular range from a scanning angle at the left edge to a scanning angle at the right edge of each level peak group and determine whether there is a level peak distribution width not less than a predetermined value. When the determination is affirmative, the flow goes via step S21 to step S22.

Step S21 is to subtract a standard level peak distribution (hereinafter referred to simply as a standard distribution) from a level peak distribution of a level peak group whose level peak distribution width is not less than the predetermined value, thereby creating a new level peak group. Step S22 is to extract a typical scanning angle of each new level peak group created in step S21.

Figure 4A:
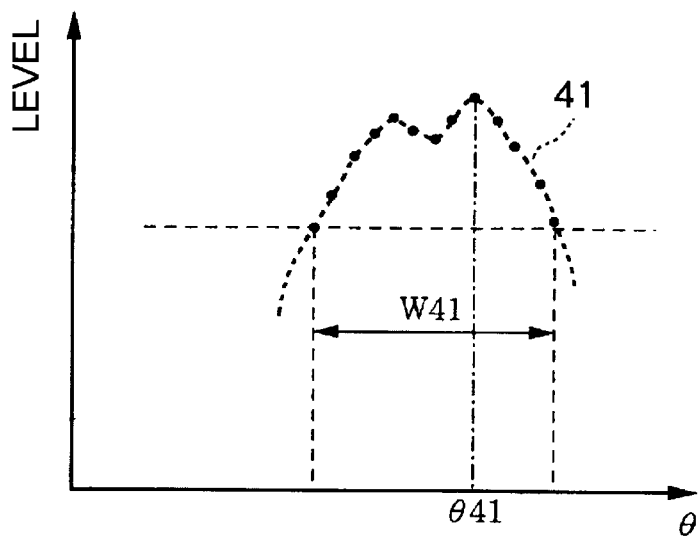
FIG. 4A is a graph for explaining a subtraction operation of a standard distribution from a level peak distribution.
Figure 4B:
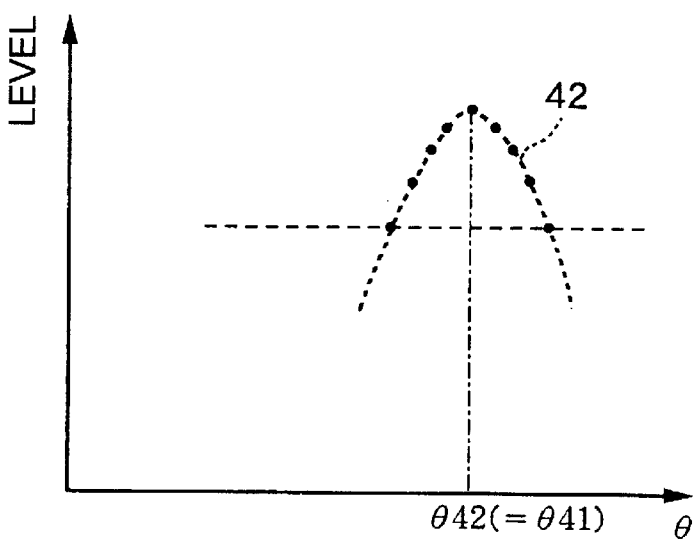
FIG. 4B is a graph for explaining the subtraction operation of the standard distribution from the level peak distribution.
Figure 4C:
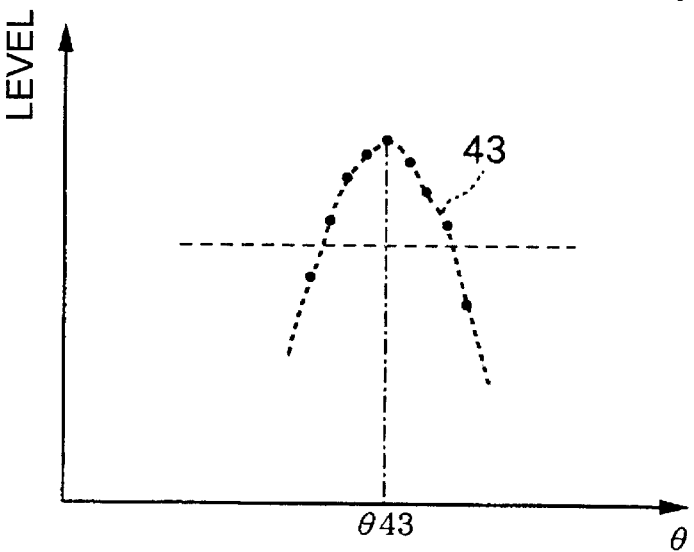
FIG. 4C is a graph for explaining the subtraction operation of the standard distribution from the level peak distribution.

FIGS. 4A to 4C are graphs for explaining the operation in steps S21 and 22. FIG. 4A shows a level peak distribution of a level peak group before the subtraction operation, FIG. 4B a standard distribution, and FIG. 4C a new level peak distribution created after the subtraction operation. In each graph, the scanning angles are plotted along the abscissa while the peak levels along the ordinate.

The level peak distribution 41 illustrated in FIG. 4A is one resulting from the grouping in step S17, the typical scanning angle θ41 thereof is extracted in step S18, and it is determined in step S20 that the distribution width thereof W41 is not less than the predetermined value.

The level peak distribution 42 illustrated in FIG. 4B is the standard distribution for the level peak distribution 41. This standard distribution is such a normalized distribution that a typical scanning angle of a level peak distribution and a peak level at the typical scanning angle with a standard single target agree with the typical scanning angle of the level peak distribution 41 and the peak level at the typical scanning angle. The level peak distribution with the standard single target is preliminarily measured and stored.

The level peak distribution 43 illustrated in FIG. 4C is the result of the subtraction of this standard distribution 42 from the level peak distribution 41.

It is considered that a level peak distribution having a distribution width over the predetermined value is based on reflected waves from plural targets. The level peak distribution 41 is based on reflected waves from two targets moving abreast at the same distance and at the same speed and the typical scanning angle θ41 thereof is based on the reflected wave from one target. The standard distribution 42 is an assumed level peak distribution based on only the reflected wave from the one target. The level peak distribution based on only the reflected wave from the other target can be assumed by subtracting the standard distribution from the level peak distribution 41. The level peak distribution 43 is the thus assumed distribution and a typical scanning angle θ43 thereof indicates the direction of the other target. The typical scanning angle θ42 of the standard distribution 42 is the same as the typical scanning angle θ41 of the level peak distribution 41 from the definition.

Then the processing unit moves to step S23. Step S23 is to determine whether the series of operations from step S12 to step S22 described above were carried out for the both up interval and down interval. When the determination is negative, the processing unit returns to step S11; when it is affirmative, the processing unit proceeds to step S24.

The situation of the flow from step S23 back to step S11 is that the sequential operations from step S14 to step S22 are finished based on the beat frequency data of the up interval but are not carried out yet based on the beat frequency data of the down interval. Therefore, the determination in step S11 must be negative this time. Then the processing unit moves to step S13 to read the beat frequency data of the down interval calculated and stored in step S10. The operations from step S14 to step S22 are then carried out based on this read data. At this time, when the processing unit moves to step S23, the determination is affirmative. Thus the processing unit goes to step S24.

Step S24 is to perform pairing between the level peak groups of the up interval and the level peak groups of the down interval. The pairing is to mate two level peak groups assumed to be based on a single target, with each other, and a way of the pairing will be described referring to FIGS. 3A, 3B and FIGS. 4A to 4C.

A typical scanning angle of each level peak group represents a center direction of a target. Level peak groups based on one target can be paired by coupling two level peak groups having an equal typical scanning angle with each other accordingly.

In FIGS. 3A and 3B, the level peak groups 31 and 32 of the up interval both have the typical scanning angle θ1 and can be mated with the level peak group 35 having the typical scanning angle θ1 in the down interval. As for the typical scanning angle θ2, the level peak group 33 of the up interval is paired with the level peak group 37 of the down interval; as for the typical scanning angle θ3, the level peak group 34 of the up interval is paired with the level peak group 36 of the down interval.

Since for the typical scanning angle θ1 there are the two level peak groups 31, 32 in the up interval, it is necessary to employ either one as a pairing counterpart of the level peak group 35 of the down interval and eliminate the other. A selection factor in this case can be either comparison between maximums of level peaks or comparison between their level peak distribution widths. Pairing is made between level peak groups with closer maximums of level peaks or between level peak groups with closer level peak distribution widths. The reason is that the level peak maximums or the level peak distribution widths should be approximately equal as long as the level peak groups are based on the reflected wave from one target.

From either of the viewpoints, the pairing counterpart of the level peak group 35 is the level peak group 31 and the level peak group 32 is handled as noise. In this case, the data of level peak group 32 is ignored; however, this operation, at least, can avoid an error of pairing between the level peak group 35 and the level peak group 32.

One-to-one correspondence is definitely defined as to the typical scanning angles θ2 and θ3. What should be noted here is that, because the pairing is carried out using the typical scanning angles, correct pairing is achieved even if the relation of magnitude of beat frequencies is reverse between in the up interval and in the down interval.

If the pairing were conducted between the individual level peaks according to equal scanning angles without the grouping, the level peaks composing the level peak group 33 could be paired with the level peaks composing the level peak group 36 with an extremely high possibility. The present embodiment, however, can avoid such a pairing error.

Figure 5A:
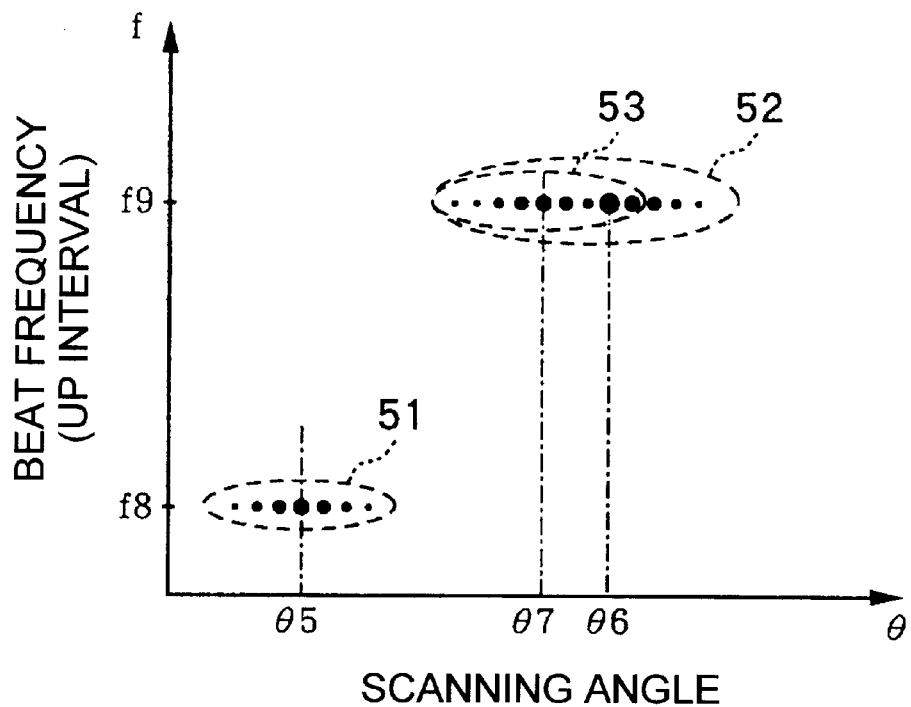
FIG. 5A is a graph for explaining pairing of level peak groups.
Figure 5B:
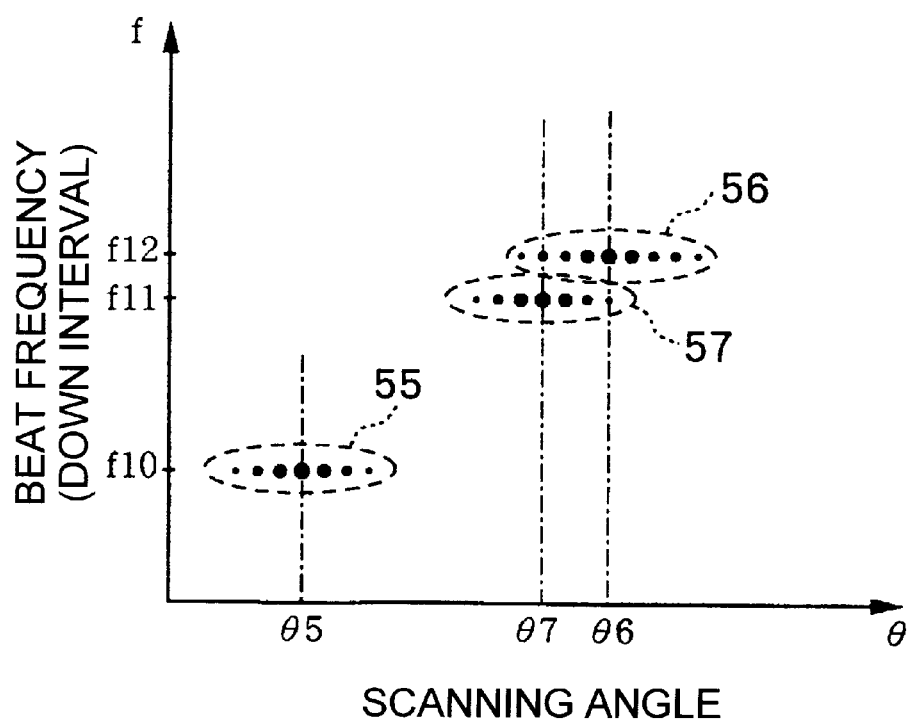
FIG. 5B is a graph for explaining pairing of level peak groups.

FIGS. 5A and 5B are graphs to show another example concerning the pairing between the level peak groups. FIG. 5A shows the grouping in the up interval and FIG. 5B the grouping in the down interval, similar to FIGS. 3A and 3B. In FIGS. 5A and 5B, the scanning angles are plotted along the abscissa and the beat frequencies along the ordinate. Each level peak is indicated by a dot and the size of each dot indicates a height of a level peak. The higher the level peak, the larger the size of a dot.

This example is a situation in which a level peak group having a level peak distribution width over the predetermined value is created during the grouping of the up interval. It is a level peak group 52 and steps S21, S22 in the flowchart of FIG. 2 result in creating a new group 53. Through this operation, there are three level peak groups 51, 52, 53 in the up interval and the typical scanning angles thereof are θ5, θ6, and θ7, respectively.

On the other hand, the level peak groups in the down interval are three level peak groups 55, 56, 57 having the typical scanning angles of θ5, θ6, and θ7, respectively, from the beginning. Therefore, groups having an equal typical scanning angle can be paired with each other uniquely.

After completion of the pairing in step S24 in this way, the processing unit transfers to step S25 to calculate the distance and speed of each target using the beat frequencies of the level peak groups thus paired. This arithmetic operation is one based on the fundamental principle of the FM-CW radar apparatus.

The detection principle of the FM-CW radar apparatus will be described briefly below for reference' sake.

Let f0 be the center frequency of the transmitted signal, ΔF be the frequency modulation width, fm be the FM modulation frequency, fr be a beat frequency when the relative speed of the target is zero (the beat frequency in a narrow sense), fd be a Doppler frequency based on the relative speed, fb1 be a beat frequency in the up interval, and fb2 be a beat frequency in the down interval. Then the following equations hold.

$$fb1=fr-fd \qquad (1)$$

$$fb2=fr+fd \qquad (2)$$

Once the beat frequencies fb1 and fb2 in the up interval and the down interval of modulation cycle are measured separately, fr and fd can be calculated from the following equations (3) and (4) accordingly.

$$fr=(fb1+fb2)/2 \qquad (3)$$

$$fd=(fb2-fb1)/2 \qquad (4)$$

After fr and fd are calculated, the range R and velocity V of target can be calculated according to the following equations (5) and (6).

$$R=(C/(4 \cdot \Delta F \cdot fm)) \cdot fr \qquad (5)$$

$$V=(C/(2=f0)) \cdot fd \qquad (6)$$

Here, C is the speed of light.

In the case of the example of FIGS. 3A and 3B, in the combination of the level peak group 33 with the level peak group 37, f3 and f7 correspond to fb1 and fb2, respectively, in above Eqs. (1) to (4).

In step S26, time series motion of targets is detected by combination of the ranges R and velocities V of targets thus obtained with past target information and types and future motion of targets are predicted from the time series motion, so as to perform more detailed target recognition.

The present embodiment is arranged to carry out the beam scanning by the DBF synthesis, but the beam scanning can be either of the phased array method or of the mechanical method.

As described above, the FM-CW radar apparatus of the present invention is arranged to carry out the grouping of the level peaks of beat frequencies in each of the up interval and down interval and thereafter carry out the pairing between the level peak groups in the up interval and in the down interval; therefore, it can suppress occurrence of pairing errors and can perform accurate target detection.

From the invention thus described, it will be obvious that the invention may be varied in many ways. Such variations are not to be regarded as a departure from the spirit and scope of the invention, and all such modifications as would be obvious to one skilled in the art are intended for inclusion within the scope the following claims.

What is claimed is:

1. A scanning FM-CW radar apparatus comprising:

peak extracting means for extracting level peaks at each scanning angle of beat frequencies, each beat frequency being a frequency difference between a received wave and a transmitted wave, in each of a modulation frequency increasing interval and a modulation frequency decreasing interval;

grouping means for grouping level peaks of approximately equal beat frequencies adjacent in a scanning direction to create level peak groups having respective typical scanning angles, for either of said increasing-interval level peaks and decreasing-interval level peaks thus extracted;

pairing means for pairing a level peak group in the increasing interval with a level peak group in the decreasing interval where said level peak groups have an equal typical scanning angle; and calculating means for calculating target information from beat frequencies of the increasing-interval and decreasing interval level peak groups thus paired.

2. The FM-CW radar apparatus according to claim 1, wherein said typical scanning angle is a scanning angle of a level peak indicating the highest level in each said level peak group.

3. The FM-CW radar apparatus according to claim 2, wherein said grouping means divides a level peak group created into two level peak groups when said level peak group has a peak distribution width not less than a predetermined width.

4. The FM-CW radar apparatus according to claim 3, wherein one of said two divided level peak groups is a first level peak group having a standard distribution whose typical scanning angle is equal to that of the level peak group before the division and the other is a second level peak group resulting from subtraction of said first level peak group from said level peak group before the division.

5. The FM-CW radar apparatus according to claim 4, wherein said first level peak group is a group resulting from normalization of level peak data of a single target preliminarily measured and stored.

* * * * *